Oct. 28, 1941.              A. HEDEMAN                2,260,454
                          HOSE CONNECTION
                         Filed July 26, 1940
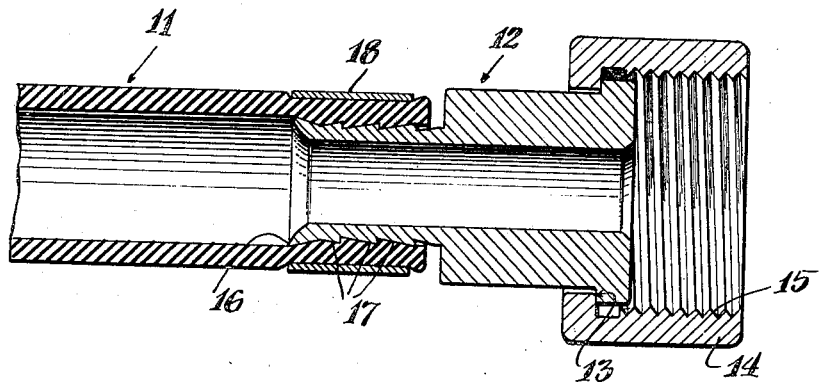
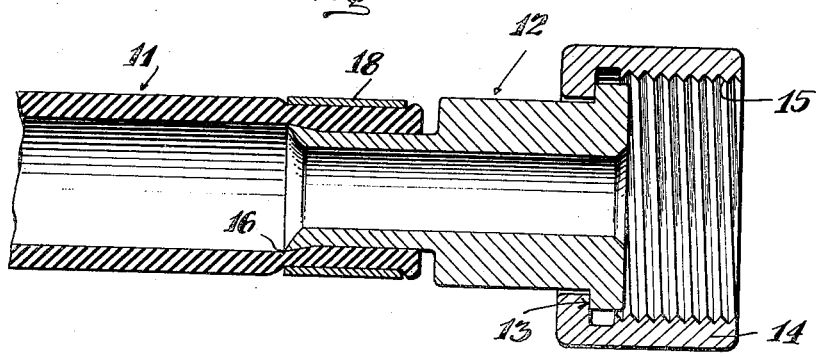
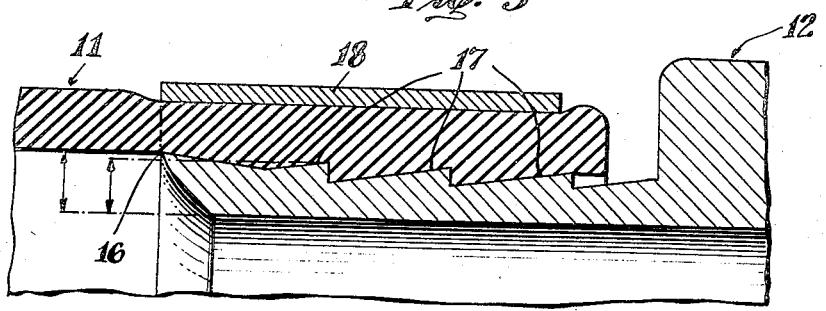
INVENTOR
Alexander Hedeman
BY
ATTORNEYS Patented Oct. 28, 1941

2,260,454

UNITED STATES PATENT OFFICE 2,260,454

HOSE CONNECTION

Alexander Hedeman, New York, N. Y.

Application July 26, 1940, Serial No. 347,579

2 Claims. (Cl. 285—84)

The invention relates to improvements in hose connections and has for an object to provide an improved hygienic connection between a flexible hose and a nipple or other member which serves to connect the hose to other parts for use.

Hose connections of the type heretofore known have been found very unsatisfactory for use in handling liquids intended for human consumption, such as beer, carbonated beverages, milk, and the like, for the reason that they were so constructed that the liquid under pressure seeped into the crevice between the inside surface of the hose and the exterior of the nipple. In such devices it is impossible to remove the liquid which has been forced into the annular pocket between the nipple and the hose, with the result that a very unsanitary condition developed. The accumulated liquid was there attacked by bacteria, causing putrefaction which deleteriously affected the taste and imparted an odor to liquid food thereafter passed through the hose.

It is an object of the present invention to overcome these difficulties by so constructing the hose connection that no pocket can be formed between the hose and the nipple even under the high pressure conditions existing when used with beer and other beverages under pressure, or other fluid whether liquid, gaseous or mixtures thereof.

It is another object of the invention to so construct the nipple that its extremity is formed with an annular ridge, the maximum diameter of which is substantially at the extreme end of the nipple, thus precluding the formation of a pocket in which the liquid may accumulate.

It is another object to reduce the axial length of said ridge to a minimum so as to reduce the area of contact with the hose and therefore increase the contact pressure and the sealing effect.

It is another object of the invention to provide clamping means adapted to press the hose firmly against said annular ridge whereby all seepage of the liquid between the hose and the nipple is effectively prevented.

Other objects will appear from the following description of two illustrative embodiments of the invention taken together with the attached drawing wherein:

Fig. 1 is a cross-sectional view of one form of hose connection embodying and illustrating the invention;

Fig. 2 is a similar view showing a modified form of nipple; and

Fig. 3 is an enlarged cross-section of a part of the form shown in Fig. 1.

Referring to said drawing, the numeral 11 indicates a flexible hose made of a rubber-like material and the numeral 12 indicates a nipple inserted therein. As shown, the nipple may be formed with a flange providing a shoulder 13 against which may bear a collar 14 formed with threads 15 for connecting to other devices.

It will be noted that the end of the nipple is provided with an annular enlargement or ridge 16, the maximum diameter of which is substantially in line with the extremity of the nipple 12. The nipple may also be provided with a series of annular enlargements 17 generally of the conformation shown. It is to be noted however, that the enlargements 17 are preferably made somewhat smaller in diameter than the terminal annular enlargement 16, as appearing more clearly in Fig. 3, so as to make certain that maximum pressure will be applied as between the hose and the annulus 16. The annuli 17 may be regarded as serving as strain relievers to prevent the hose from being pulled off the nipple in case of a tension upon the hose. They are not intended however as sealing members since the annular ridge 16 effectively prevents the entry of fluid between the hose and the nipple.

The numeral 18 designates a clamp of any suitable type for the purpose of pressing the hose against the annular ridge 16 and assuring the effective sealing of the connection between the hose and the nipple. The use of a clamp is not essential but is desirable where the hose is to be used for transmitting liquid under substantial pressure.

Fig. 2 illustrates a modified embodiment of the invention in which the annuli 17 are not used. The operation of the device is the same however in that effective sealing occurs at the top of the annular ridge 16.

It has been found that hose connections of the type utilizing the present invention permit keeping the hose in sanitary and hygienic condition as none of the liquid or ingredients thereof or sediment contained therein can be forced between the nipple and the hose.

Having described two illustrative embodiments of the invention it is pointed out that various changes and modifications therein may be made without departing from the invention as set forth in the following claims:

1. In combination, a hose of flexible material, a tubular nipple fitting therein, the end of the tubular nipple being formed with an integral annular ridge the maximum diameter of which occurs at the extreme end of the nipple, and a band contracted upon the exterior of the hose in line with the said integral annular ridge whereby a tight seal is formed at the extreme end of the nipple and the formation of pockets or depressions is avoided.

2. In combination, a hose of flexible material, a tubular nipple fitting therein, the end of the tubular nipple being formed with an integral annular ridge the maximum diameter of which occurs at the extreme end of the nipple and being formed with a plurality of integral annular ridges of smaller diameter between said first-mentioned annular ridge and the other end of the nipple, and a band contracted upon the exterior of the hose in line with the said first-mentioned annular ridge, whereby a tight seal is formed at the extreme end of the nipple and the formation of pockets or depressions is avoided.

ALEXANDER HEDEMAN.